United States Patent
Huang

(10) Patent No.: US 8,224,380 B2
(45) Date of Patent: Jul. 17, 2012

(54) STRUCTURE OF AN APPARATUS FOR SHARING VIDEO INPUT/OUTPUT MODULES AMONG HANDHELD DEVICES

(75) Inventor: Wen-Lung Huang, Hsinchu (TW)

(73) Assignee: V.R. Technology Co., Ltd., Hsinchu (TW)

( * ) Notice: Subject to any disclaimer, the term of this patent is extended or adjusted under 35 U.S.C. 154(b) by 487 days.

(21) Appl. No.: 12/499,189

(22) Filed: Jul. 8, 2009

(65) Prior Publication Data
US 2011/0007217 A1    Jan. 13, 2011

(51) Int. Cl.
H04M 1/00 (2006.01)
H04B 1/38 (2006.01)
H04N 3/27 (2006.01)
H04N 5/64 (2006.01)

(52) U.S. Cl. ............... 455/556.1; 455/557; 455/559; 348/554; 348/838

(58) Field of Classification Search ........ 455/90.3, 455/400, 403, 550.1, 556.1–556.2, 566, 575.1, 455/575.8, 41.1–41.3, 66.1, 514, 517, 557–559; 348/14.01–14.04, 14.07, 158, 231.7, 231.9, 348/333.07, 554, 564, 567, 838–839; 386/326, 386/353, 362; 370/487, 490, 375.71, 419–421, 370/428, 502, 911, 913; 709/211, 213–216; 710/1–3, 7–8, 12–13, 27, 62, 68, 72–74, 710/100–106, 110, 313, 316
See application file for complete search history.

(56) References Cited

U.S. PATENT DOCUMENTS

| | | | |
|---|---|---|---|
| 5,587,735 A * | 12/1996 | Ishida et al. | 348/14.04 |
| 5,872,565 A * | 2/1999 | Greaves et al. | 715/723 |
| 5,903,850 A | 5/1999 | Huttunen et al. | |
| 6,417,797 B1 * | 7/2002 | Cousins et al. | 342/179 |
| 6,459,906 B1 | 10/2002 | Yang | |
| 6,965,400 B1 * | 11/2005 | Haba et al. | 348/222.1 |
| 7,013,163 B2 | 3/2006 | Jaggers et al. | |
| 7,317,475 B2 * | 1/2008 | Arai et al. | 348/207.99 |
| 7,404,001 B2 * | 7/2008 | Campbell et al. | 709/231 |
| 7,412,259 B2 * | 8/2008 | Yoo et al. | 455/557 |
| 7,417,299 B2 * | 8/2008 | Hu | 257/528 |
| 7,426,595 B2 | 9/2008 | Osaka | |
| 2004/0127201 A1 | 7/2004 | Takayama et al. | |
| 2007/0026945 A1 * | 2/2007 | Nguyen | 463/42 |
| 2007/0239935 A1 * | 10/2007 | Chen | 711/115 |
| 2009/0257360 A1 * | 10/2009 | Patel et al. | 370/252 |
| 2010/0214419 A1 * | 8/2010 | Kaheel et al. | 348/207.1 |

FOREIGN PATENT DOCUMENTS
CN     201163377 Y  * 12/2008

* cited by examiner

Primary Examiner — Meless Zewdu
(74) Attorney, Agent, or Firm — Lin & Associates IP, Inc.

(57) ABSTRACT

A structure of an apparatus for sharing video input/output modules among handheld devices is provided, including a sharing slot, with a top golden finger part and a bus cable to form a first signal path from the video input module of a handheld device, and a bottom golden finger part and a bus cable and a connector to from a second signal path to a video input processor of the handheld device. The present invention may further include a bypass element for shorting the two signal paths by connecting the top golden finger part and the bottom golden finger part of the sharing slot. With the present invention, a second handheld device having extending signal paths can be inserted into the sharing slot of the first handheld device to use the video input/output module of the first handheld device to accomplish the sharing of video input/output modules among handheld devices.

10 Claims, 9 Drawing Sheets

STRUCTURE OF AN APPARATUS FOR SHARING VIDEO INPUT/OUTPUT MODULES AMONG HANDHELD DEVICES

FIELD OF THE INVENTION

The present invention generally relates to a structure of an apparatus for sharing video input/output modules among handheld devices.

BACKGROUND OF THE INVENTION

As the popularity of electronic devices grows, a user may own a variety of handheld devices, such as, mobile phone, portable media player (PMP), digital still camera (DSC), camera recorder (DVR), handheld game console, global positioning system (GPS), notebook/netbook PC, etc., and each comes with built-in or own video input/output modules. As the profit margin of electronic devices keeps decreasing, finding a way to further reduce the product cost while maintaining or increasing the functionality and flexibility of the products is imperative for staying competitive. Among the alternatives, sharing the video input/output modules among these handheld devices shows a promising approach.

Many handheld devices use CIS/CCD camera module (CCM) for video input and use LCD module (LCM) for video output. Many standard interfaces are also adopted by the video input/output modules. For example, for video input module, interfaces such as ITU-R 601/656, MIPI CSI-2, SMIA CCP-2, MDDI are commonly used, and for video output module, interfaces like MIPI DSI are also widely used. In comparison, in addition to a plurality of standardized interfaces, such as Memory Storage Card or USB for compatibility, most handheld devices also use proprietary interfaces in the design. The proprietary interfaces of the handheld devices pose a problem for sharing video input/output modules among handheld devices.

FIG. 1 shows a schematic view of an exemplary conventional handheld device. As shown in FIG. 1, handheld device 100 includes a plurality of interfaces for external signals and devices, such as, a video input module 110, universal serial bus (USB) 111 for communicating with PC, notebook or printer, a proprietary interface connector 112 for earphone and microphone, a connector 113 for charging battery, a memory card slot 114 for SD or CF card for data storage, a composite video output interface 115, a video output module 130, and a key pad module 170. In addition, some handheld devices may also include video input interface, such as A/V input for recording and playing back, and video output interface, such as A/V output for transmitting audio/video to external devices, such as, TV or projector.

FIG. 2 shows a schematic view of the internal structure of handheld device 100 of FIG. 1 cracked open and video output module removed aside. As shown in FIG. 2, Printed circuit board (PCB) 200 further includes a video input processor 210, a video output processor 220 and a housekeeping processor 230, a video input socket 240, a video output socket 250. On PCB 200, video input socket 240 is connected to video input processor 210 and video output socket 250 is connected to video output processor 220. In addition, video input processor 210, video output processor 220 and housekeeping processor 230 are interconnected to one another. Finally, video input module 110 is connected to video input socket 240 through cable 110a and connector 110b, and video output module 130 is connected to video output socket 250 through cable 130a and connector 130b. In other words, video input stream from video input module 110 is eventually passed to video input processor 210 through cable 110a, connector 110b and video input socket 240. Similarly, video output stream from video output processor 220 is delivered to video output module 130 through video output socket 250, connector 130b and cable 103a.

FIG. 3 shows a schematic view of a functional block diagram corresponding to a handheld device of FIG. 1 with the connection cables, connectors and sockets omitted from the view. As shown in FIG. 3, handheld device 100 includes video input processor 210, video output processor 220 and housekeeping processor 230, in addition to aforementioned video input module 110, USB 111, a memory card slot 114, composite video output interface 115, video output module 130, and key pad module 170. Proprietary earphone and microphone connector 112 and battery charging connector 113 are omitted from the diagram to simplify the view. Also shown in FIG. 3, video input module 110 is connected to video input processor 210, video output module 130 and composite video output 115 are both connected to video output processor 220 for receiving video output from video output processor, and USB connector 111, memory card slot 114 and key pad module 170 are all connected to housekeeping processor 230. With such connections, the video generated by video input module 110 is passed to video input processor 210 for processing. Similarly, the processed video is passed from video output processor 220 to video output module 130. The video processing may be accomplished through the collaboration of video input processor 210, video output processor 220 and housekeeping processor 230.

A plurality of designs using different approaches is developed to share video input/output module. Website (http://www.nokiausa.com/n97/technicalspecifications) disclosed an approach using non-volatile storage media, such as micro SD memory, or CF memory. This approach stores the video stream into the storage media and the storage media can be used in another handheld for playing back. A serious disadvantage of this approach, however, is that the real-time utilizing or sharing the video input/output module is impossible.

Website (http://www.nokiausa.com/n97/technicalspecifications) also disclosed a method of using wireless communication, such as, Bluetooth, WiFi 802.11a/b/g to share video generated from the video input module with another device. To receive and extract the video, a corresponding transceiver consisting of RF module, demodulator for physical layer, media access control (MAC) for link layer and application firmware or software, is required for the other device.

U.S. Pat. No. 7,412,259 disclosed a mobile phone with USB interface to share video input module through USB connector. However, even the 40Mbytes/sec throughput of USB 2.0 is insufficient for the increasing resolution requirements.

Additional compression mechanism, such as JPEG, MPEG, is required to reduce the throughput demands to meet the USB 2.0 restriction. Furthermore, the handheld device will consume more power and require more software computing and hardware for compressing and decompressing the video stream.

Another approach is to incorporate as many functions into a single handheld device as possible so that all these functions can share the video input/output modules within the same handheld device. For example, U.S. Pat. No. 6,417,797 disclosed a system for a multi-purpose portable imaging device and methods for using the same, U.S. Pat. No. 6,459,906 disclosed a method and system for displaying received messages of portable television phone, and U.S. Patent Publication No. 2004/0,127,201 disclosed a cellular phone having TV reproduction function. However, this approach usually results in high-end handheld device that is either too costly or having more function than desired.

Yet another approach is to share the video input module through analog composite video signal interface. For example, TV set can provide analog composite video input module to accept analog video signal. For digital display modules, such as TFT-LCD display panel, the analog composite signal is sampled by analog-to-digital converter (ADC) and processed by TV decoder to extract the color chrominance, saturation and brightness information, and to transform the extracted information to RGB or YUV/YCbCr color domain for display module. This approach, as the previous approach, requires more hardware, software and power, and often leads to higher cost.

Yet another approach is to provide docking system for connecting handheld device to another device. For example, U.S. Pat. No. 5,903,850 disclosed a mobile phone and interface configuration in a mobile phone, U.S. Pat. No. 7,013,163 disclosed a portable wireless communication device docking system and U.S. Pat. No. 7,426,595 disclosed a desktop holder and portable terminal system. However, no actual sharing of video input/module is provided by the above patents.

The disadvantage common to the cited prior arts is that no affordable solution is provided to allow flexible and convenient sharing of video input/output modules among different handheld devices. It is imperative to devise a solution so that the future handheld device can be further economical and functional competitive.

SUMMARY OF THE INVENTION

The present invention has been made to overcome the aforementioned drawback of conventional inability of video input/output module sharing among handheld devices. The primary object of the present invention is to provide a structure of an apparatus for sharing video input/output modules among handheld devices. With the present invention, a second handheld device can use a first handheld device having video input/output modules as its own video input/output modules so as to provide higher flexibility and low cost handheld devices.

To achieve the above object, the present invention provides a structure of an apparatus for sharing video input/output modules among handheld devices, including a sharing slot, with a top golden finger part and a bus cable to form a first signal path from the video input module of a handheld device, and a bottom golden finger part and a bus cable and a connector to from a second signal path to a video input processor of the handheld device. The present invention may further include a bypass element for shorting the two signal paths by connecting the top golden finger part and the bottom golden finger part of the sharing slot. With the present invention, a second handheld device having extending signal paths can be inserted into the sharing slot of the first handheld device to use the video input/output module of the first handheld device to accomplish the sharing of video input/output modules among handheld devices.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
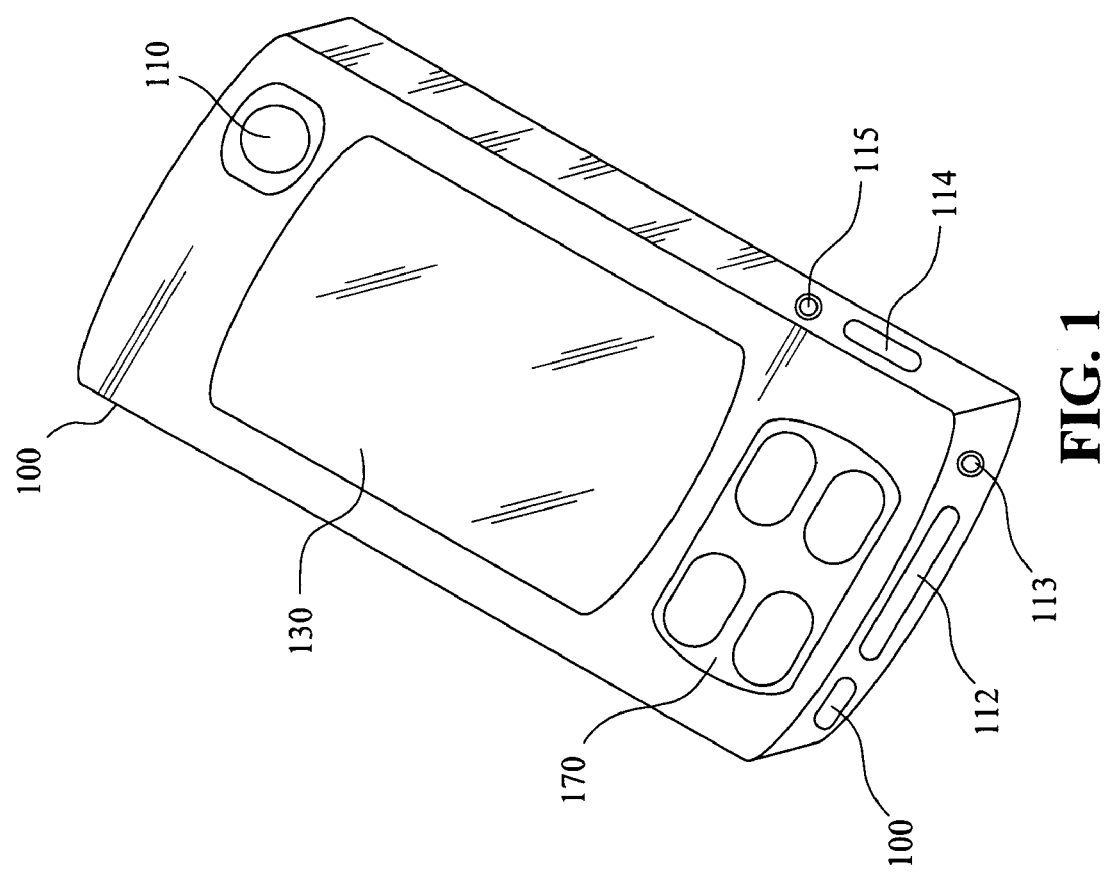
FIG. 1 shows a schematic view of an exemplary conventional handheld device.
Figure 4:
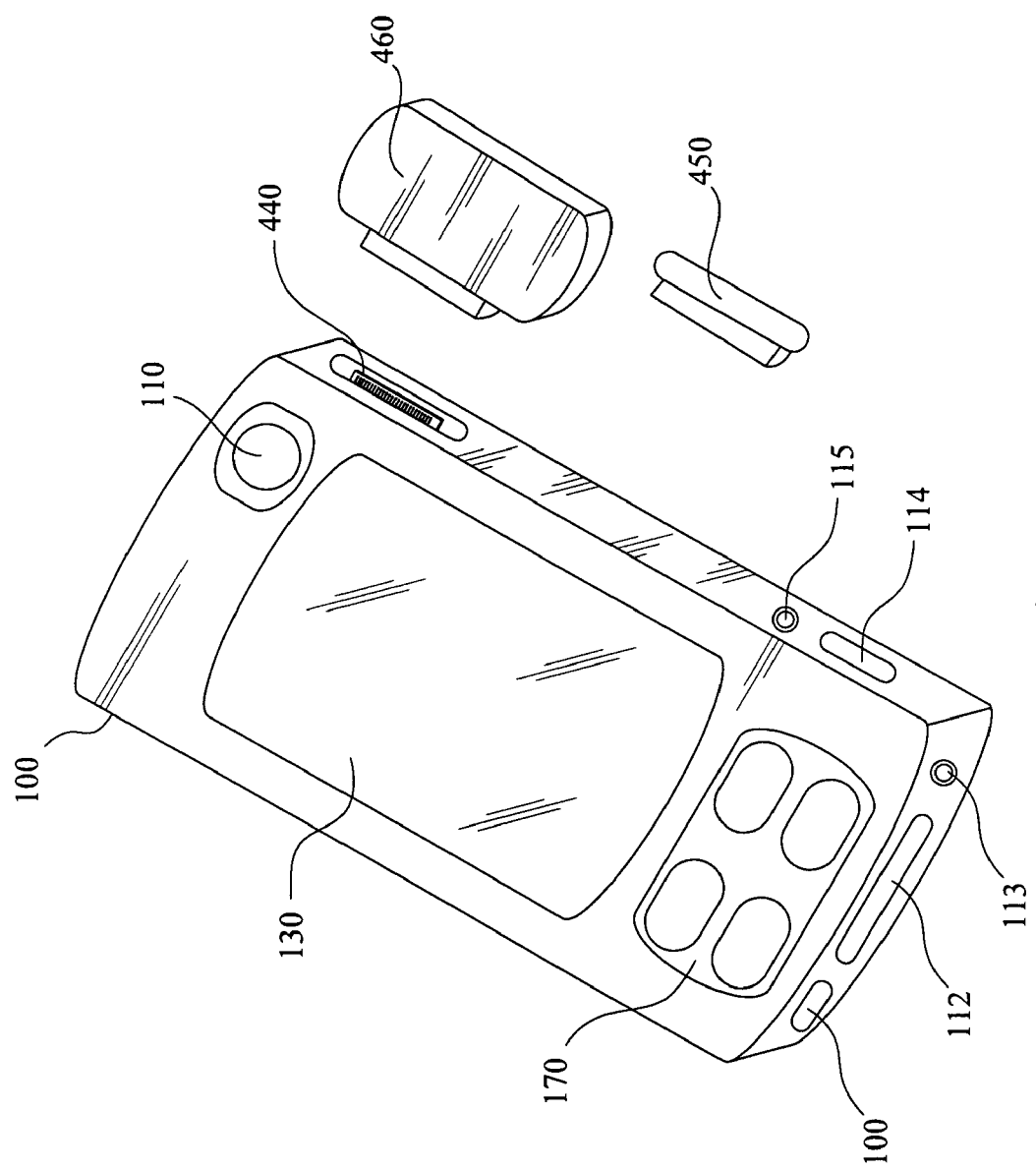
FIG. 4 shows a schematic view of a structure for sharing video input and output modules in handheld devices according to the present invention.

FIG. 4 shows a schematic view of a structure for sharing video input and output modules in handheld devices according to the present invention. As shown in FIG. 4, a handheld device 400 is similar to handheld device 100 of FIG. 1. That is, handheld device 400 further includes a video sharing slot 440, in addition to a plurality of interfaces for external signals and devices, namely, a video input module 110, universal serial bus (USB) 111 for communicating with PC, notebook or printer, a proprietary interface connector 112 for earphone and microphone, a connector 113 for charging battery, a memory card slot 114 for SD or CF card for data storage, a composite video output interface 115, a video output module 130, and a key pad module 170 of handheld vice 100 of FIG. 1. In addition, some handheld devices may also include video input interface, such as A/V input for recording and playing back, and video output interface, such as A/V output for transmitting audio/video to external devices, such as, TV or projector.

FIG. 4 also shows a bypass element 450 and an external sharing handheld device 460. Bypass element 450 must be inserted into sharing slot 440 when no external sharing handheld device is present to share video input/output modules with handheld device 400. In other words, with bypass element 450 inserted into sharing slot 440, handheld device 400 will be identical with handheld device 100 of FIG. 1. To share the video input/output modules, bypass element 450 is removed from sharing slot 440, and another external sharing handheld device 460 is inserted into sharing slot 440 so as to use video input/output modules of handheld device 400.

Figure 2:
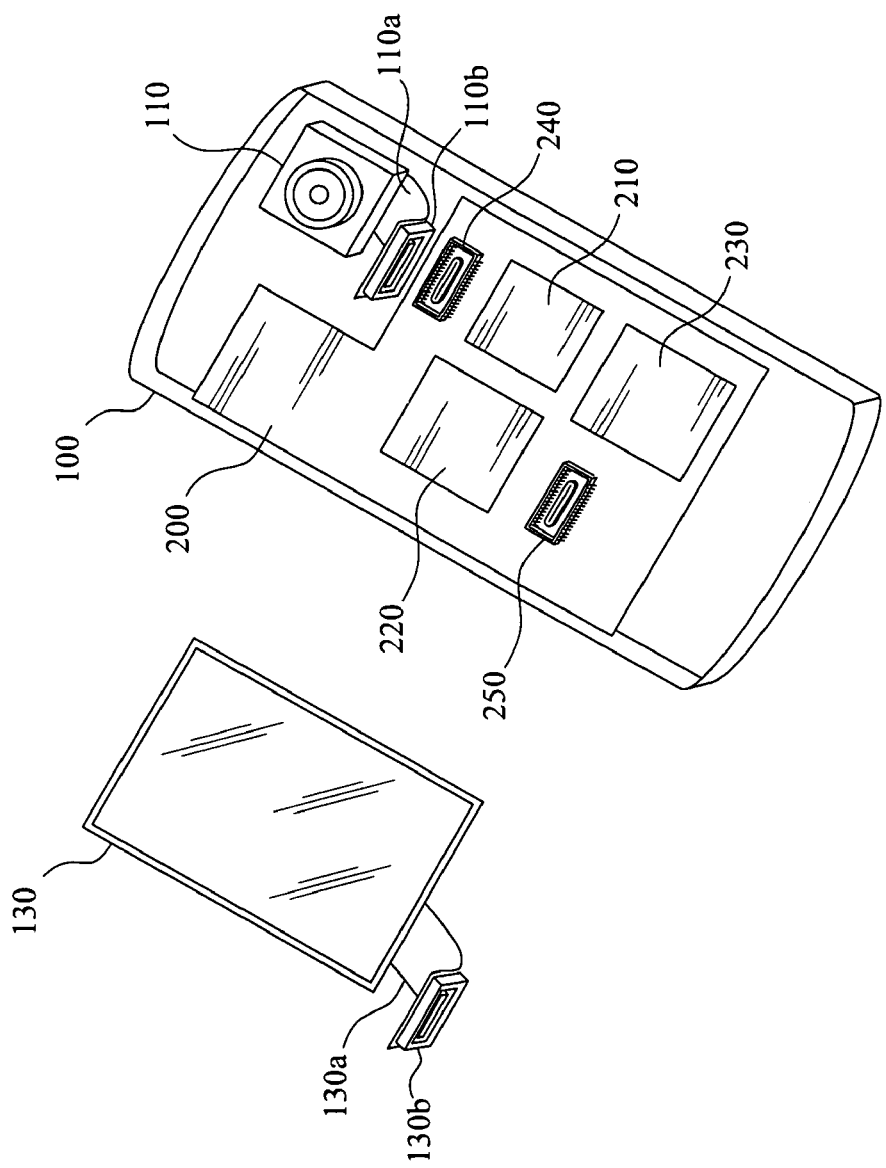
FIG. 2 shows a schematic view of the internal structure of handheld device 100 of FIG. 1 cracked open and video output module removed aside.
Figure 5:
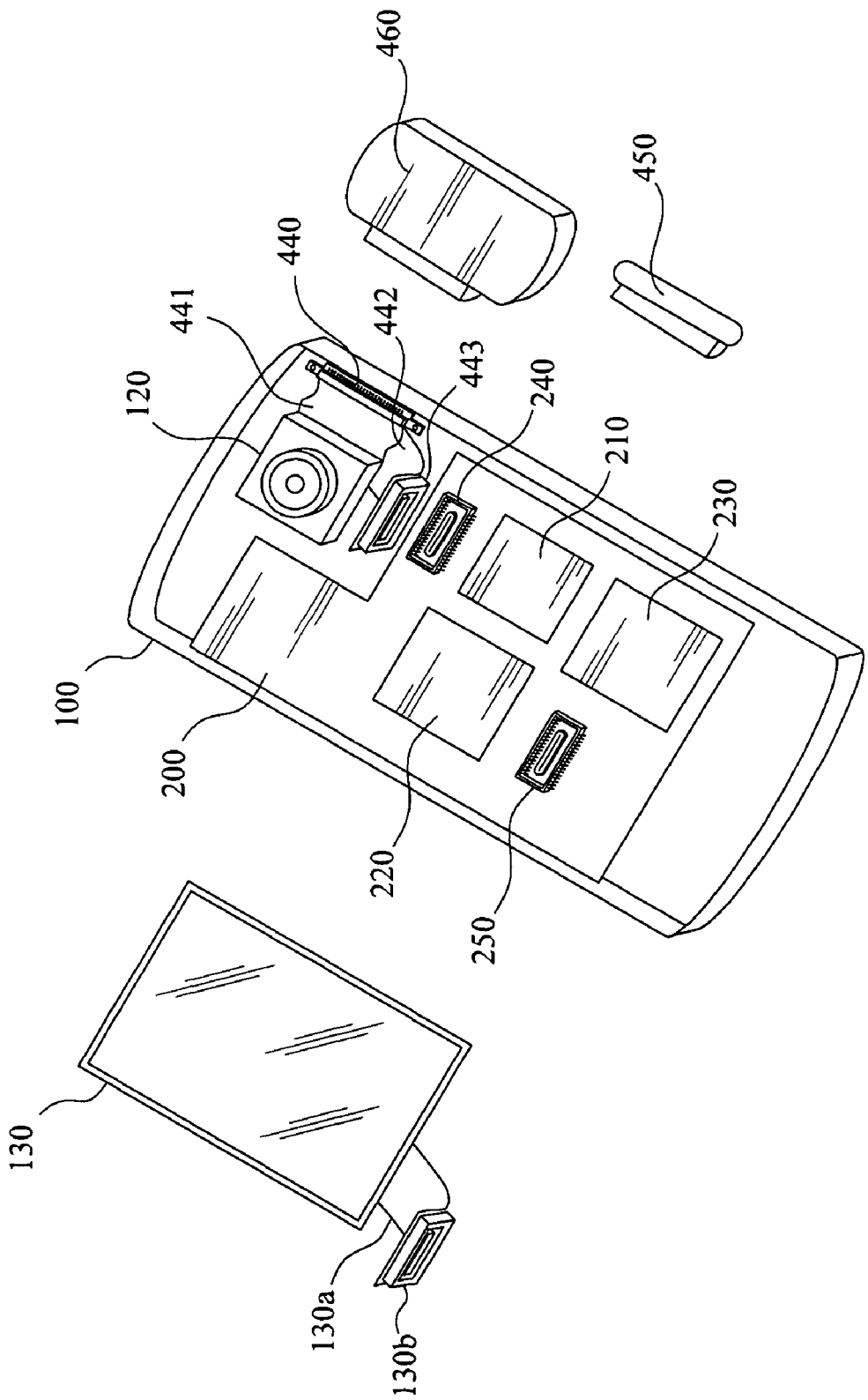
FIG. 5 shows a schematic view of the internal structure of handheld device 400 of FIG. 4 cracked open and video output module removed aside.

FIG. 5 shows a schematic view of the internal structure of handheld device 400 of FIG. 4 cracked open and video output module removed aside. FIG. 5 is similar to the view shown in FIG. 2. The difference is that FIG. 5 shows video input module 110 is connected to sharing slot 440 and then connected to PCB 200, instead of connecting to PCB 200 directly, as shown in FIG. 2.

Figure 3:
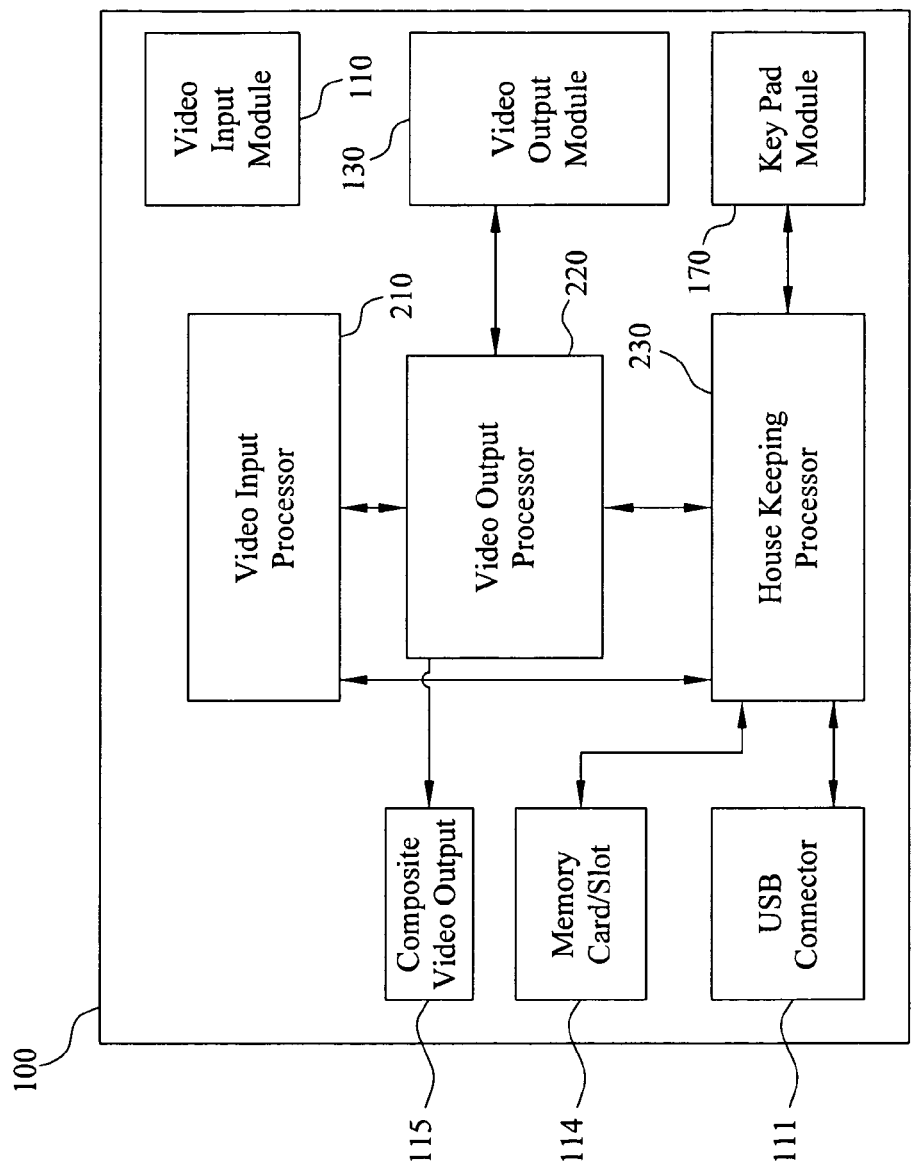
FIG. 3 shows a schematic view of a functional block diagram corresponding to a handheld device of FIG. 1 with the connection cables, connectors and sockets omitted from the view.
Figure 6:
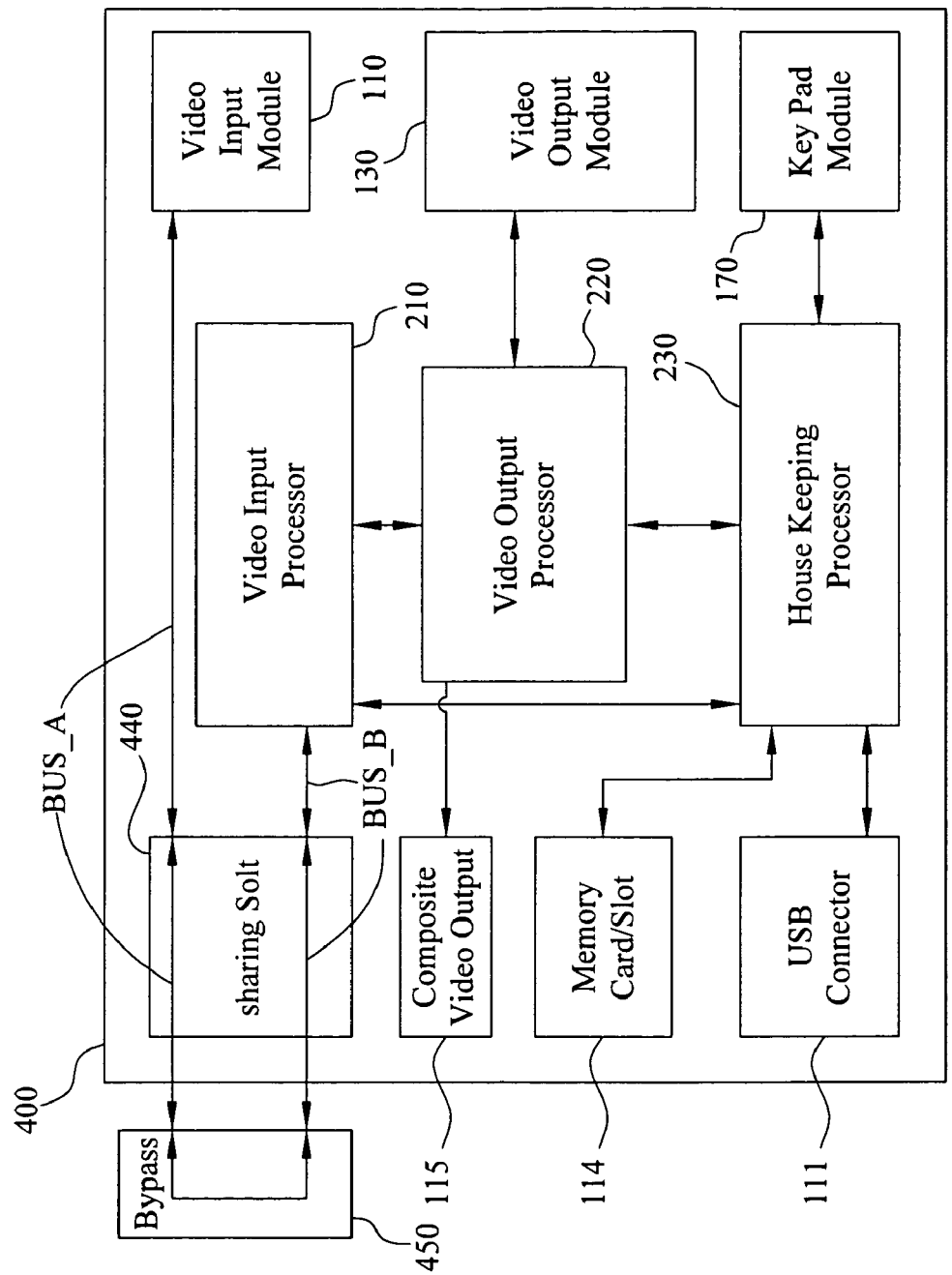
FIG. 6 shows a schematic view of a functional block diagram corresponding to handheld device 400 of FIG. 4 with the connection cables, connectors and sockets omitted from the view.

FIG. 6 shows a schematic view of a functional block diagram corresponding to handheld device 400 of FIG. 4 with the connection cables, connectors and sockets omitted from the view. FIG. 6 is similar to the view shown in FIG. 3. The main differences of FIG. 6 and FIG. 3 are the inclusion of sharing slot 440, bypass element 450, two buses BUS_A, BUS_B and connection change related to the inclusion of sharing slot 440. FIG. 6 shows a view that bypass element 450 is inserted into sharing slot 440 so that handheld device 400 behaves like handheld device 100 of FIG. 1; when not sharing video input/output module with another external handheld device. As shown in FIG. 6, when bypass element 450 is inserted into sharing slot 440, video input module 110 is connected through bus BUS A and bus BUS_B to video input processor 210. Buses BUS_A, BUS_B extend through sharing slot 440. In this manner, video input stream from video input module 110 is passed through BUS_A, BUS_B to video input processor 210 for processing.

Figure 7A:
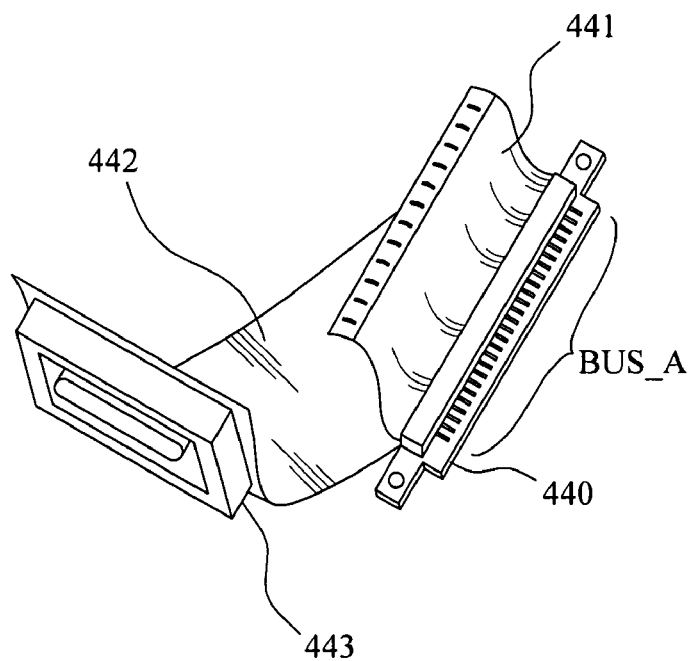
FIG. 7A shows a top view of sharing slot with connected bus cable and connector according to the present invention.
Figure 7B:
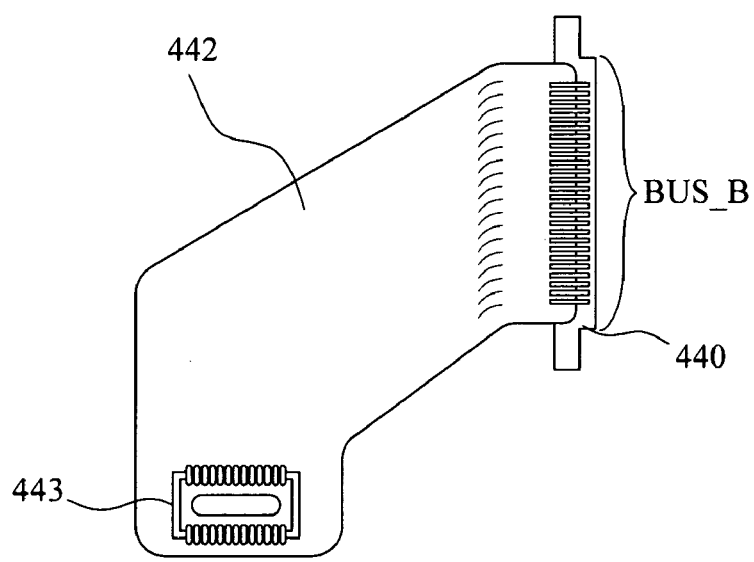
FIG. 7B shows a bottom view of sharing slot with connected bus cable and connector according to the present invention.

FIG. 7A and FIG. 7B show a top view and a bottom view of sharing slot 440 with connected bus cables 441, 442 and connector 443, respectively. The top view of FIG. 7A shows the part of golden fingers of BUS_A, and the bottom view of FIG. 7B shows the part of golden fingers of BUS_B. Connector 443 is for connecting to video input socket 240 on PCB 200. In other words, BUS_A is embodied as the signal path formed by top golden finger part and bus cable 441 to connect video input module 110. Similarly, BUS_B is also embodied as the signal path formed by bottom golden finger part, bus cable 442 and connector 443 to connect socket 240.

Figure 8A:
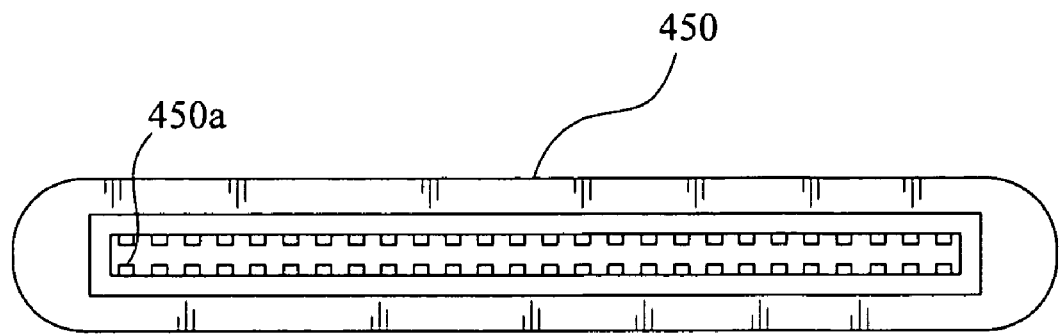
FIG. 8A shows a front view of bypass element according to the present invention.
Figure 8B:
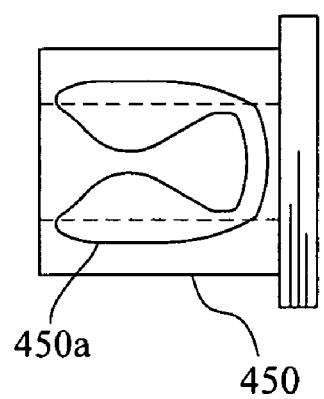
FIG. 8B shows a top view of bypass element according to the present invention.

FIG. 8A and FIG. 8B shows a front view and a top view of bypass element 450, respectively. The front view of FIG. 8A shows two rows of metal 450a that can be used to short buses BUS_A and BUS_B when bypass element 450 is inserted into sharing slot 440. FIG. 8B shows a schematic top view of metal part 450a forming signal loops for corresponding golden fingers of BUS_A and BUS_B.

Figure 9:
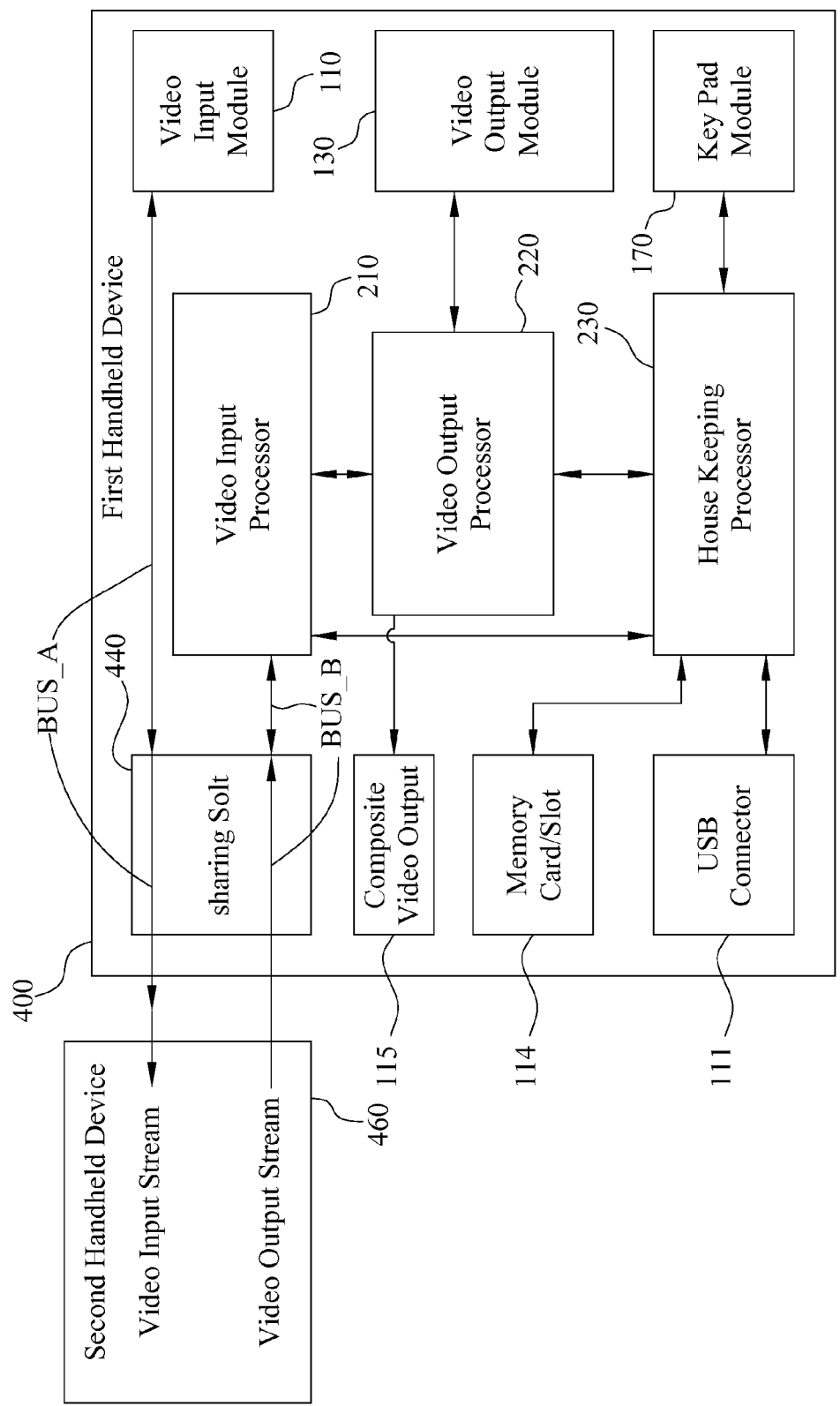
FIG. 9 shows a schematic view of a handheld device sharing the video input/output modules with an external sharing handheld device according to the present invention.

FIG. 9 shows a schematic view of a first handheld device 400 sharing the video input/output modules with a second handheld device which is illustrated as an external sharing handheld device 460. FIG. 9 is similar to the view shown in FIG. 6. The difference is that, instead of a bypass element 450 inserted into sharing slot 440, the external sharing handheld device 460 is inserted into sharing slot 440 to share video input module 110 and video output module 130. As shown in FIG. 9, video input stream is passed from video input module 110, BUS _A, through sharing slot 440 to external sharing handheld device 460. In this manner, external sharing handheld device 460 uses video input module 110 as its own video input module. Similarly, video output stream from external sharing handheld device 460 is passed through BUS _B (through sharing slot 440) to video input processor 210 for processing, in collaboration with video output processor 220 and housekeeping processor 230 to be displayed on video output module 130. In this manner, external sharing handheld device 460 uses video output module 130 as own video output module.

In summary, the present invention provides a structure for sharing video input and output modules among handheld devices. An apparatus of the structure of the present invention can be used in a handheld device having a video input module, a video input processor, a video output module, a video output processor, and a housekeeping processor. The apparatus of the structure of the present invention includes a sharing slot with embedded bus cable and connector to form a video stream path from video input module and a video stream path to video input processor. When the handheld device is not sharing the video input/output modules, a bypass element is inserted into the sharing slot to short the two video stream paths so that the handheld device operates as the conventional handheld device. For sharing, an external sharing handheld device can be inserted into sharing slot so that the two video stream paths can be connected respectively to the external sharing handheld device for using the video input module and video output module of another handheld device.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A structure of a first handheld device for facilitating a second handheld device to use and share a video input module and a video output module of said first handheld device, said first handheld device further having a video input processor, a video output processor and a housekeeping processor, said video input processor, said video output processor and said housekeeping processor collaborating to process a video stream for displaying on said video output module, said video output module connected to said video output processor, said structure comprising:

a sharing slot, slot including an exposed top golden finger part and a bottom golden finger part;

a bypass element with a plurality of metal teeth to electrically connect said top golden finger part and said bottom golden finger part when said bypass element is inserted into said sharing slot for said first handheld device to operate as a standalone device;

a first bus cable, electrically connected to said top golden finger part when said first bus cable is connected to said sharing slot; and a second bus cable, electrically connected to said bottom golden finger part when said second cable is connected to said sharing slot;

wherein said top golden finger part and said first bus cable form a first signal path for said video stream from said video input module for sharing said video input module, and said bottom golden finger part and said second bus cable form a second signal path for said video stream to be passed to said video input processor for processing said video stream and sharing said video output module.

2. The structure as claimed in claim 1, further comprising a connector, connected to said second bus cable to connect a socket electrically connected to said video input processor.

3. The structure as claimed in claim 1, wherein said first bus cable is connected to said video input module directly.

4. The structure as claimed in claim 1, wherein when said bypass element is inserted in said sharing slot, said video stream from said video input module is directly passed to said video input processor, and said first handheld device operates as a conventional stand-alone handheld device.

5. The structure as claimed in claim 1, wherein said second handheld device comprises a first signal extending path for receiving said video stream from said video input module of said first handheld device to accomplish the sharing of said video input module.

6. The structure as claimed in claim 1, wherein said second handheld device comprises a second signal extending path for passing said video stream from said second handheld device to said video input processor of said first handheld device to accomplish the sharing of said video output module.

7. A structure of a first handheld device for facilitating a second handheld device to use and share a video input module and a video output module of said first handheld device, said first handheld device further having a video input processor, a video output processor and a housekeeping processor, said video input processor, said video output processor and said housekeeping processor collaborating to process a video stream for displaying on said video output module, said video output module connected to said video output processor, said structure comprising:

a sharing slot including an exposed top golden finger part and a bottom golden finger part;

a bypass element with a plurality of metal teeth to electrically connect said top golden finger part and said bottom golden finger part when said bypass element is inserted into said sharing slot for said first handheld device to operate as a standalone device;

a first bus cable, electrically connected to said top golden finger part when said first bus cable is connected to said sharing slot;

a second bus cable, electrically connected to said bottom golden finger part when said first bus cable is connected to said sharing slot; and wherein said top golden finger part and said first bus cable form a first signal path for said video stream from said video input module for sharing said video input module, said bottom golden finger part and said second bus cable form a second signal path for said video stream to be passed to said video input processor for processing said video stream and sharing said video output module, and said second handheld device comprises a second signal extending path for passing said video stream from said second handheld device to said video input processor of said first handheld device to accomplish the sharing of said video output module.

8. The structure as claimed in claim 7, further comprising a connector, connected to said second bus cable to connect a socket electrically connected to said video input processor.

9. The structure as claimed in claim 7, wherein said first bus cable is connected to said video input module directly.

10. The structure as claimed in claim 7, wherein said second handheld device comprises a first signal extending path for receiving said video stream from said video input module of said first handheld device to accomplish the sharing of said video input module.

* * * * *